(12) United States Patent
Finley, Jr.

(10) Patent No.: US 6,953,378 B1
(45) Date of Patent: Oct. 11, 2005

(54) WILD GAME CALLER HOUSING

(76) Inventor: John F. Finley, Jr., 640 Orchard Dr., Malvern, AR (US) 72104

(*) Notice: Subject to any disclaimer, the term of this patent is extended or adjusted under 35 U.S.C. 154(b) by 0 days.

(21) Appl. No.: 09/704,808

(22) Filed: Nov. 2, 2000

(51) Int. Cl.⁷ ................................................ A63H 5/00
(52) U.S. Cl. ...................................... 446/207; 446/208
(58) Field of Search ................................ 446/207, 208, 446/209, 202, 203

(56) References Cited

U.S. PATENT DOCUMENTS

| | | | | |
|---|---|---|---|---|
| 4,483,097 A | * | 11/1984 | Piper | 446/207 |
| 4,850,925 A | * | 7/1989 | Ady | 446/207 |
| 4,888,903 A | * | 12/1989 | Knight et al. | 446/207 |
| 4,897,067 A | * | 1/1990 | Piper | 446/207 |
| 4,927,399 A | * | 5/1990 | Mueller | 446/207 |
| 4,960,400 A | * | 10/1990 | Cooper | 446/207 |
| 5,061,220 A | * | 10/1991 | Cooper | 446/208 |
| 5,222,903 A | * | 6/1993 | Parrott et al. | 446/207 |
| 5,234,369 A | * | 8/1993 | Forbes et al. | 446/207 |
| 5,520,567 A | * | 5/1996 | Jacobsen | 446/207 |
| 5,785,574 A | * | 7/1998 | Sears | 446/208 |
| 5,910,039 A | * | 6/1999 | Primos et al. | 446/207 |
| 6,045,429 A | * | 4/2000 | Marino | 446/207 |
| 6,083,075 A | * | 7/2000 | Meeks | 446/207 |
| 6,120,341 A | * | 9/2000 | Hafford | 446/207 |

* cited by examiner

Primary Examiner—Derris H. Banks
Assistant Examiner—Bena B. Miller
(74) Attorney, Agent, or Firm—Joe D. Calhoun

(57) ABSTRACT

A device for housing the frame containing the reed(s) in a caller for producing sound to attract wild game, said housing device comprising essentially planar elastomeric material defining an essentially planar cavity adapted to relatively snugly capture the frame without interfering with the sound producing characteristics of the reed(s). Said housing may include a resiliently flexible flap facilitating adapted to closely contact the user's palate.

20 Claims, 1 Drawing Sheet

WILD GAME CALLER HOUSING

CROSS-REFERENCE TO RELATED APPLICATIONS

Not applicable.

STATEMENT REGARDING FEDERALLY SPONSORED DEVELOPMENT

Not applicable.

TECHNICAL BACKGROUND OF THE INVENTION

1. Field of the Invention

The invention described herein generally relates to the field of devices for calling or otherwise attracting wild game. More particularly, the present invention relates generally to devices for calling turkeys or elk, using diaphragm reeds to produce sound.

2. Related Art

Many conventional animal callers use air blown past one or more reed members to produce sound. One common assembly involves a flat reed wedged between wood or cork, and air being blown past that assembly to cause the reed to vibrate and thereby produce sound. See, for example, U.S. Pat. No. 3,991,513.

Another assembly involves an elastomeric reed over an off-center air outlet aperture in the conically tapered end face of a cylindrical hollow mouth piece, said reed being secured by a ring within a circumferential groove of said mouthpiece. See, for example, U.S. Pat. No. 5,090,937.

Another caller assembly involves essentially U-shaped frames, situated one atop the other and sandwiching therebetween a reed. See U.S. Pat. No. 5,061,220. This device is inserted inside the hunter's mouth and situated near the upper palate, to facilitate the blowing of air past the diaphragm reed as breath exits the user's mouth. Often this device includes an essentially crescent shaped flap of taped or similar material, that contacts the user's palate to partially prevent the misdirection of breath between the palate and caller (rather than beneath the caller).

Also known is a modular game call system including a game call device with a sound-producing diaphragm removably coupled thereto. See U.S. Pat. No. 5,885,125.

The following patents are known to the inventor, and arguably affect the patentability of the invention:

| U.S. Pat. No. | Inventor | Issue Date |
| --- | --- | --- |
| 3,722,133 | Morgan | 27 Mar. 1973 |
| 3,811,221 | Wilt | 21 May 1974 |
| 3,815,283 | Piper | 11 Jun. 1974 |
| 4,576,584 | Hill | 18 Mar. 1986 |
| 4,752,270 | Morton | 21 Jun. 1988 |
| 4,950,198 | Repko | 21 Aug. 1990 |
| 5,061,220 | Cooper | 29 Oct. 1991 |
| 5,562,521 | Butler et al. | 8 Oct. 1996 |
| 5,885,125 | Primos | 23 Mar. 1999 |

SUMMARY OF THE INVENTION

The invention described herein generally comprises a caller housing sized to accept a frame containing at least one sound-producing member. Ideally, the device comprises an interior cavity adapted to readily accept a variety of caller frames.

One embodiment of the invention comprises (includes) a caller housing sized to relatively snugly capture as essentially planar U-shaped frame sandwiching at least one diaphragm reed, holding said frame-reed while not interfering with the sound producing characteristics. The invention may also include an essentially crescent-shaped flap or flange essentially surrounding the frame on all sides except the unhoused reed extending between the arms of the U-shaped frame.

One primary object of the invention is to provide a housing that facilitates interchanging or substitution of caller frames readily. The hunter will thereby be enabled to change the tune or tenor of game calling relatively easily.

Another object of the invention is to provide a housing having a resiliently flexible flap capable of more comfortably preventing or reducing the mis-direction of breath between the palate and caller (rather than beneath the caller).

Another object of the invention is to provide a housing having a flap more readily conformable to the configuration of a user's palate. This will eliminate or reduce the natural gag reflex often accompanying the initial usage of similar callers presently in use.

DESCRIPTION OF THE DRAWINGS

The following describes the drawings accompanying this application, which are incorporated herein.

Figure 1:
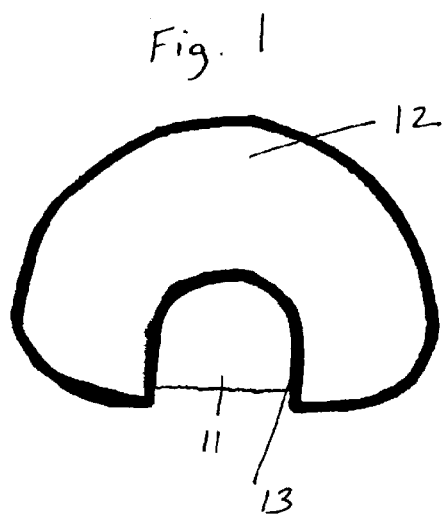
FIG. 1 is a top plan view of one version of the housing device with frame (within internal cavity) holding a reed (11), said housing including a dorsal aspect (12) and a U-shaped cavity mouth (13).
Figure 2:
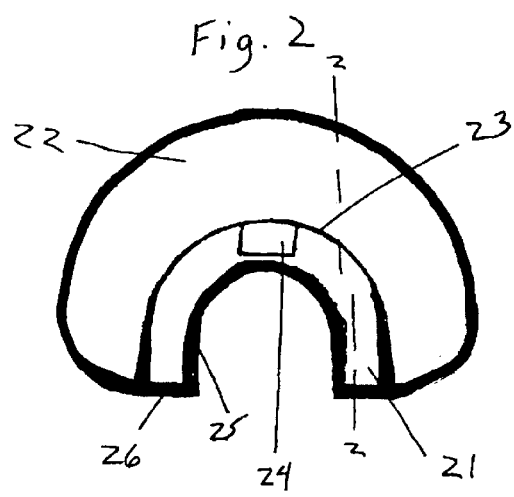
FIG. 2 is a top plan cutaway view of one version of the housing device, essentially with the upper housing surface removed, depicting a U-shaped cavity (21), a dorsal flap (22), a buttress (23) a tab indentation (24), the edge of a U-shaped cavity mouth (25), and a pair of ventral end-stop portions (26).
Figure 3:
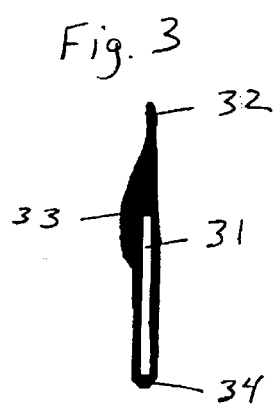
FIG. 3 is a cross section view of the device depicted in FIG. 2, sectioned at dashed line 2—2. Noteworthy are the cavity (31), a dorsal flap (32), a convex upper surface (33), and a ventral end-stop (34).
Figure 4:
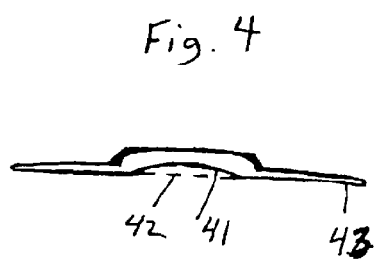
FIG. 4 depicts another version of the housing device, viewed from the back, showing a concave lower dorsal surface (41), the reed surface ventral thereto (dashed line) (42), and flap (43).
Figure 1:
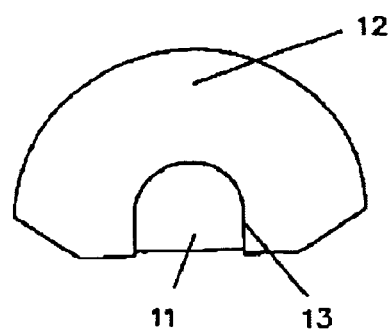
Figure 2:
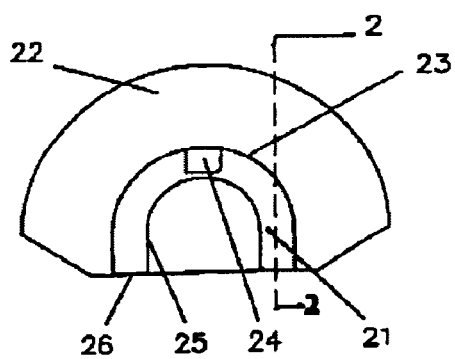
Figure 3:
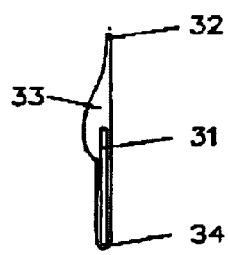
Figure 4:

These drawings illustrate certain details of certain embodiments; however, the invention disclosed herein is not limited to only the embodiments so illustrated. The invention disclosed herein may have equally effective or legally equivalent embodiments.

DETAILED DESCRIPTION OF THE INVENTION

The claims of this invention are to be read to include any legally equivalent device or method. Before the present invention is described in detail, it is to be understood that the invention is not limited to the particular configurations, process steps and materials disclosed herein. It is also to be understood that the terminology used herein is not intended to be limiting, since the scope of the present invention will be limited only by the claims and equivalents thereof.

The invention is not limited by construction materials to the extent that such materials satisfy the structural or functional requirements; for example, any materials may be used to make the housing so long as the materials fulfill the requirements that the housing be capable of accepting a frame with reed, and holding same while in use. In another example, any materials may be used to make the housing so long as it will allow removal of one frame with reed, and the substitution of another for holding during use.

For the sake of simplicity and to give the claims of this patent application the broadest interpretation and construction possible, the following definitions will apply to this application:

a. The word "cavity" means a hollow or hole within the housing; in this case, the cavity will not be completely enclosed, since the housing has an opening or mouth through which a caller frame-reed assembly may be inserted into the cavity.

b. The word "crescent" means having at least one essentially convex edge, perhaps terminating in end points (or similar transition configurations) also comprising the termination points of an essentially concave edge; crescent may refer to the general shape of the flap portion of the housing, or that of the housing (including the integral or contiguous flap portion).

c. The word "dorsal" means generally toward the back side, especially the back side of the user's body, relative to other portions of the invention; for example, a dorsal portion of a housing may be that portion closest to the user's back (or the back of his or her throat), even if the caller is held in front of the user.

d. The word "flexible" means bendable or moldable; flexible may include materials that are either resiliently flexible (capable of returning to the initial resting position after flexion) or essentially permanently flexible (capable of retaining the flexed form after molding).

e. The term "horseshoe-shaped" means a two dimensional closed figure essentially having an outer are and an essentially corresponding inner arc, each having ends or arms situated essentially parallel to the other at termination; horseshoe may also include a three dimensional counterpart of the above, usually in an essentially planar configuration; in many variations of this version of the invention, while the invention is in use the horseshoe may be oriented in an essentially horizontally planar orientation so that an airstream transverses from the arcs past the arms, and over the free edge of any reed situated essentially between the arms and/or ends of the horseshoe.

f. The word "mimic" means to essentially simulate, resemble or imitate closely, or to essentially conform to the configuration of the adjacent surface.

g. The word "palate" means the upper and/or back portion of a person's oral cavity, sometimes referred to as the roof of the mouth (or hard palate) and/or the soft palate.

h. The term "quazi-horseshoe-shaped" means essentially horseshoe-shaped and having a physical boundary along the outer arc (and possibly along the ends), but having no physical boundary along the inner arc.

i. The term "U-shaped" means an essentially one dimensional figure generally resembling the letter U, or an arc therein; as an example, U-shaped may include the outline of an inner arc of a horseshoe shape, such as the edges of the housing along the cavity mouth.

j. The word "ventral" means generally further from the back side, especially the back side of the user's body, relative to other portions of the invention; for example, a ventral portion of a housing may be that portion furthest from the user's back (or the back of his or her throat), even if the caller is held in front of the user.

The aforementioned definitions are not intended to be strictly limiting. Naturally whether a particular figure or shape resembles a horse-shoe or a crescent, or some combination thereof, is a subjective determination. The invention disclosed herein using said defined terms should not be limited to only one precise definition, or interpretation thereof. A different figure or shape may be acceptable, if the structural and functional features remain intact.

Likewise, when the plural form is used, it may be taken to include the singular form, and vice versa, when the context of usage will give the claims the broadest meaning appropriate. Similarly, the conjunctive "and" may also be taken to include the disjunctive "or", and vice versa, for the sake of simplicity and whenever necessary to give the claims of this patent application the broadest interpretation and construction possible.

In its most general form, the invention disclosed here comprises (includes) a device for housing the frame containing the reed(s) in a caller for producing sound to attract wild game, said housing device comprising essentially planar flexible material defining an essentially planar cavity adapted to relatively snugly capture the frame without interfering with the sound producing characteristics of the reed(s).

Although the materials selected to construct the housing may be any materials satisfying the structural and functional characteristics of the housing disclosed herein, ideally the housing will be constructed of elastomeric material having sufficient flexibility and resiliency to provide the necessary housing characteristics, capturing characteristics and release features of the invention. Alternatively, the housing may be constructed with moldable materials having sufficient flexibility and conformational memory to essentially retain the molded conformation. Examples of suitable flexible materials may include those selected from the group of polymeric compounds such as silicon silastic E (made by Dow Corning), Saniprene, silicon based compounds, latex based compounds, or any other moldable or resilient materials, and combinations thereof. Ideally the materials are safe for inclusion in a user's oral cavity.

The invention may also include a housing device wherein said housing comprises a ventral aspect and a dorsal aspect; in versions of the invention intended to be used by situating the caller-housing assembly near the palate of the user's mouth, said ventral aspect of the housing is that portion situated (while in use) relatively nearer to the user's chest side, whereas said dorsal aspect is that portion situated relatively further from the user's chest side.

In one version of the invention, said cavity of said housing opens toward said ventral aspect of the housing. Moreover, said dorsal aspect may include a flap essentially surrounding said cavity housing around and behind said ventral opening. The cavity may be dorsally bounded by buttress of said housing, said dorsal aspect comprising a flap essentially integrally extending dorsally from said buttress.

The housing may be a single-piece device having an essentially planar crescent body having a mouth along the interior arc, opening into a cavity formed within the central and/or ventral portion of the housing, and with a relatively thinner or converging flap portion extending dorsally past or from that portion of the housing forming the buttress wall of the cavity.

One more particular version of the invention is intended for use with a particular type of caller frame-reed assembly, wherein the caller essentially includes a pair of essentially horseshoe-shaped planar halves, each mate-able with a corresponding plane of the other. When mated or otherwise sandwiched together, the upper plane of the upper half forms an upper plane of the combined pair, while the lower plane of the lower half forms a lower plane of the combined pair; they also include an essentially joined dorsal arc edge and respective unjoined ventral arc edges, essentially sandwiching therebetween at least one resiliently-flexible reed essentially spanning the ventrally oriented space essentially situated between the corresponding ventral arcs and the opposing pair of corresponding horseshoe arms. (One frame-reed assembly already known includes an elongated circular frame of aluminum (or similar bendable material) having a tab at the rounded top of one semi-circular half; a semi-circle of flexible reed material is positioned to cover a corresponding semi-circular half of the elongated frame, then the frame is essentially folded one semi-circular half atop the other thereby forming an essentially horse-shaped frame (with the edges of the intermediate reed captured therebetween), and the tab is folded over the rounded top of the other semi-circular half to maintain the sandwiching or closure of the reed therebetween.)

In this particular version of the invented housing device, the housing device comprises and defines an essentially quasi-horseshoe-shaped cavity sized to relatively snugly envelop the upper and lower plane and the dorsal arc edge of the caller frame, said ventral aspect of said housing comprising an essentially U-shaped ventral opening to said quasi-horseshoe-shaped cavity, along the inner arc. An endstop may be included at each end of each arm of the horseshoe-shaped housing, to prevent the removal of the frame-reed until the desired time. There may also be included a crescent or horseshoe-shaped flap integrally extending from the housing buttress or other outer edge of the cavity wall. (To fully accommodate the acceptance of the aluminum version discussed above, the housing cavity may include an appropriate indentation or similar space for the folded-down tab to fit within.)

In another more particular version of the housing device, sized for ready placement of the caller-housing assembly at least near the palate of the user, said crescent flap may be adapted to relatively snugly contact the user's palate and prevent the passage of air between the palate and any reed. In another version of the housing device, said flap further comprises an upper surface adapted to mimic the contour of the a human palate. Such mimickry may include the ability of the housing, especially the flap, to temporarily conform with the contour of the user's palate, to essentially mimic or mirror the contour of the individual's palate. The housing or its flap may also have sufficient flexion memory to return to its initial resting position, or to retain its new contoured conformation. Alternatively, said contour-mimicking upper surface may include an essentially permanently convex surface, approximating the general contour of a palate. The convex portion may also extend over the space between the arms of the horse-shoe, so long as there is no interference with the sound producing characteristics of the reed. In another alternative version of the invention, said convex surface comprises a surface essentially permanently formed as the particular contour of a particular user's palate. Lastly in this respect, the housing or its flap may also include an essentially concave lower surface, to more efficiently direct or funnel an airstream toward the reed(s).

Besides the housing for caller frame-reed assemblies, the invention disclosed herein may also include a combination caller and device for housing the frame containing the reed(s) in the caller for producing sound to attract wild game. These versions of the invention include the combination of any of the above described housings with any of the above described caller frame-reed assemblies.

Besides the housing and the combination housing and caller frame-reed assembly, the invention disclosed herein may also include a method of making a housing device described above. Such a method includes the steps of providing a mold for forming the housing device, positioning flexible material within said mold, curing said flexible material, and removing said housing from said mold.

The scale of the Figures is not intended to be a limitation of the invention. The invention may be constructed to virtually any dimensions suiting the configuration of the user's oral cavity. One prototype version of the invention includes the following approximate dimensions: 1.25 inches, from the outer edge of one endstop to the outer edge of the other, across a ventral aspect of the invention; 1.37 inches from the ventral-most point of the endstops to the dorsal-most point of the flap; 1.96 inches from the lateral-most point of the flap to the opposite lateral-most point of the flap; 0.03 inch cross-sectional thickness of the flap; 0.015 inch thickness of the upper and lower surfaces, between the cavity and the outer surface.

The embodiment of the invention depicted in FIG. 1 is intended to be inserted into the oral cavity of the user. After positioning a caller frame-reed assembly within the cavity of the housing, with the free end of the exposed reed situated outside the housing (between the arms and inner arc of the assembly), the housing is put in a horizontally planar orientation and inserted into the mouth, then pushed up and back into contact with the palate. The edge of the crescent shaped flap will contact the palate snugly, and essentially keep the caller lodged in place during use. When the user blows, an airstream travels beneath and past the flap, past the buttress-enclosed portion of the housing, then beneath and past the free edge of the reed.

If the user desires to use a different caller frame-reed assembly, the flexible housing may be urged apart at the cavity mouth, allowing removal of the assembly then in use and replacement with another desired assembly. The resiliency of the housing allows the housing to resume its resting state, capturing the newly inserted caller frame-reed assembly within the housing cavity.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

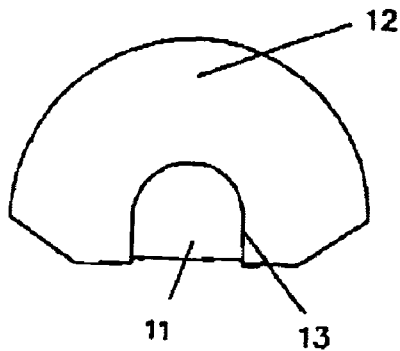

What is claimed is:

1. A housing device for releasably capturing a frame containing one or more reeds of a caller for producing sound to attract wild game, said housing device comprising essentially planar elastomeric material defining an essentially planar cavity having a size sufficient to relatively snugly capture the frame without interfering with the sound producing characteristics of the reed, said elasticity providing resilience to said housing permitting said housing to essentially flex open to either capture or release the frame.

2. A housing device described in claim 1, wherein said housing comprises an upper surface conformed to mimic the contour of a user's palate, an essentially ventral aspect and an essentially dorsal aspect;

a dorsal perimeter of said cavity bounded by buttress of said housing, and said cavity opening towards said ventral aspect; and said dorsal aspect of said housing comprising a flap essentially integrally extending dorsally from said buttress.

3. A housing device described in claim 2 wherein the housing essentially comprises a pair of essentially horseshoe-shaped planar halves foldedly joined at their ends, each half mate-able with a corresponding plane of the other, said mated halves forming an upper plane and a lower plane as well as an essentially joined dorsal arc edge and respective ventral arc edges defining said cavity opening, essentially sandwiching within said cavity said frame containing at least one resiliently-flexible reed, wherein said housing device comprises and defines an essentially quasi-horseshoe-shaped cavity sized to relatively releasably capture the upper and lower plane and the dorsal arc edge of said frame, said ventral aspect of said housing comprising an essentially U-shaped ventral opening to said quasi-horseshoe-shaped cavity.

4. A housing device described in claim 3, wherein said ventral aspect of said housing device further comprises an endstop for an end of each opposing arm of the caller frame.

5. A housing device described in claim 4, wherein said flap is essentially crescent, having an interior arc in integral extension from said buttress of said housing bounding the dorsal permitter of the cavity.

6. A housing device described in claim 5, having a size sufficient to enable ready placement of said caller at least near the palate of the user, said crescent flap conformed to relatively snugly contact the user's palate and prevent the passage of air between the palate and any reed.

7. A housing device described in claim 6 wherein said upper surface conformed to mimic the contour of a user's palate comprises an essentially convex surface.

8. A housing device described in claim 7 wherein said convex surface comprises a surface essentially formed as the contour of a human palate.

9. A housing device described in claim 7, said flap comprising an essentially concave lower surface.

10. A caller comprising a combination reed-containing frame and a housing device for releasably capturing said frame containing one or more reeds for producing sound to attract wild game, said housing device comprising essentially planar elastomeric material defining an essentially planar cavity having a size sufficient to relatively snugly capture the fame without interfering with the sound producing characteristics of the reed(s), said elasticity providing resilience to said housing permitting said housing to essentially flex open to either capture or release the frame.

11. A caller described in claim 10, said housing comprising an upper surface conformed to mimic the contour of a user's palate, an essentially ventral aspect and an essentially dorsal aspect;

a dorsal perimeter of said cavity bounded by buttress of said housing, and said cavity opening towards said ventral aspect; and said dorsal aspect of said housing comprising a flap essentially integrally extending dorsally from said buttress.

12. A caller described in claim 11, wherein:

said caller comprising a pair of essentially horseshoe-shaped planar halves each mate-able with a corresponding plane of the other, said mated pair forming an upper plane and a lower plane as well as an essentially joined dorsal arc edge and respective ventral arc edges defining said cavity opening, essentially sandwiching within said cavity said frame containing at least one resiliently-flexible reed;

said housing comprising and defining an essentially quasi-horseshoe-shaped cavity sized to relatively releasably capture the upper and lower plane and the dorsal arc edge of said frame, said ventral aspect of said housing comprising an essentially U-shaped ventral opening to said quasi-horseshoe-shaped cavity.

13. A caller described in claim 12, where said ventral aspect of said housing device further comprises an endstop for an end of each opposing arm of said frame.

14. A caller described in claim 13, wherein said flap is essentially crescent, having an interior arc in integral extension from said buttress of said housing bounding the dorsal perimeter of the cavity.

15. A caller described in claim 14 having a size sufficient to enable ready placement of said caller at least near the palate of a user, said crescent flap conformed to relatively snugly contact the user's palate and prevent the passage of air between the palate and any reed.

16. A caller described in claim 15, said flap comprising an upper surface adaptable to mimic the contour of the user's palate.

17. A caller described in claim 16, wherein said upper surface conformed to mimic the contour of the user's palate comprises an essentially convex surface.

18. A caller described in claim 17, said convex surface comprising a surface essentially formed as the contour of a human palate.

19. A caller described in claim 15, said flap comprising an essentially concave lower surface.

20. A housing device for releasably capturing a frame containing one or more reeds of a caller for producing sound to attract wild game, said housing device comprising essentially horseshoe-shaped elastomeric material comprising:

(a) an essentially crescent-shaped cavity-less planar flap portion having one edge terminating in a convex dorsal arc edge and having a second edge concluding said crescent shape, said elastomeric material extending past said second edge and diverging into a pair of essentially parallel planes ending in a parallel pair of essentially U-shaped concave ventral arc edges defining an essentially U-shaped opening into an essentially quasi-horseshoe-shaped cavity, said cavity having a size sufficient to relatively snugly capture the frame without interfering with the sound producing characteristics of the reed(s), said elasticity providing resilience to said housing permitting said housing to essentially flex open to either capture or release a frame;

(b) said housing device comprising an upper plane having an upper surface conformed to mimic the contour of a user's palate; and (c) said housing device comprising a lower plane having a lower concave surface.

* * * * *

UNITED STATES PATENT AND TRADEMARK OFFICE
CERTIFICATE OF CORRECTION

PATENT NO.   : 6,953,378 B1
DATED        : October 11, 2005
INVENTOR(S)  : John F. Finley It is certified that error appears in the above-identified patent and that said Letters Patent is hereby corrected as shown below:

The title page showing an illustrative figure, should be deleted and substitute the attached title page.

Delete Drawing Sheet 1 and substitute the drawing sheet consisting of FIGS. 1-4 as shown on the attached page.

Title page,
Item [76], Inventor, should read:
-- John F. Finley, Malvein, Arkansas --.

Signed and Sealed this

Twenty-first Day of February, 2006

JON W. DUDAS
*Director of the United States Patent and Trademark Office*

United States Patent
Finley, Jr.

(10) Patent No.: US 6,953,378 B1
(45) Date of Patent: Oct. 11, 2005

(54) WILD GAME CALLER HOUSING

(76) Inventor: John F. Finley, Jr., 640 Orchard Dr., Malvern, AR (US) 72104

( * ) Notice: Subject to any disclaimer, the term of this patent is extended or adjusted under 35 U.S.C. 154(b) by 0 days.

(21) Appl. No.: 09/704,808

(22) Filed: Nov. 2, 2000

(51) Int. Cl.[7] .................................................. A63H 5/00
(52) U.S. Cl. ........................................ 446/207; 446/208
(58) Field of Search .............................. 446/207, 208, 446/209, 202, 203

(56) References Cited

U.S. PATENT DOCUMENTS

| | | | |
|---|---|---|---|
| 4,483,097 A | * 11/1984 | Piper | 446/207 |
| 4,850,925 A | * 7/1989 | Ady | 446/207 |
| 4,888,903 A | * 12/1989 | Knight et al. | 446/207 |
| 4,897,067 A | * 1/1990 | Piper | 446/207 |
| 4,927,399 A | * 5/1990 | Mueller | 446/207 |
| 4,960,400 A | * 10/1990 | Cooper | 446/207 |
| 5,061,220 A | * 10/1991 | Cooper | 446/208 |
| 5,222,903 A | * 6/1993 | Parrott et al. | 446/207 |
| 5,234,369 A | * 8/1993 | Forbes et al. | 446/207 |
| 5,520,567 A | * 5/1996 | Jacobsen | 446/207 |
| 5,785,574 A | * 7/1998 | Sears | 446/208 |
| 5,910,039 A | * 6/1999 | Primos et al. | 446/207 |
| 6,045,429 A | * 4/2000 | Marino | 446/207 |
| 6,083,075 A | * 7/2000 | Meeks | 446/207 |
| 6,120,341 A | * 9/2000 | Hafford | 446/207 |

* cited by examiner

*Primary Examiner*—Derris H. Banks
*Assistant Examiner*—Bena B. Miller
(74) *Attorney, Agent, or Firm*—Joe D. Calhoun

(57) ABSTRACT

A device for housing the frame containing the reed(s) in a caller for producing sound to attract wild game, said housing device comprising essentially planar elastomeric material defining an essentially planar cavity adapted to relatively snugly capture the frame without interfering with the sound producing characteristics of the reed(s). Said housing may include a resiliently flexible flap facilitating adapted to closely contact the user's palate.

20 Claims, 1 Drawing Sheet